US006519263B1

(12) United States Patent
Huth (10) Patent No.: US 6,519,263 B1
(45) Date of Patent: Feb. 11, 2003

(54) PROCESS FOR TRANSMITTING DATA PACKETS OF PREDEFINABLE PRIORITY CLASSES USING ETHERNET FROM A FIRST DEVICE TO AT LEAST ONE OTHER DEVICE

(75) Inventor: Hans-Peter Huth, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/117,942

(22) PCT Filed: Mar. 4, 1997

(86) PCT No.: PCT/DE97/00406

§ 371 (c)(1),
(2), (4) Date: Aug. 10, 1998

(87) PCT Pub. No.: WO97/33409

PCT Pub. Date: Sep. 12, 1997

(30) Foreign Application Priority Data

Mar. 8, 1996 (DE) .......................................... 196 09 080
Mar. 8, 1996 (EP) ............................................. 96103699

(51) Int. Cl.[7] ................................................. H04J 3/02
(52) U.S. Cl. ..................................................... 370/444
(58) Field of Search ................................ 370/444, 443, 370/439, 413, 452; 340/825.1, 3.6

(56) References Cited

U.S. PATENT DOCUMENTS

| 4,404,557 A | * | 9/1983 | Grow ....................... 340/825.5 |
| 4,593,282 A | * | 6/1986 | Acampora et al. ........ 340/825.5 |
| 4,623,886 A | | 11/1986 | Livingston |
| 5,276,682 A | * | 1/1994 | Van As et al. ............... 370/443 |
| 5,420,572 A | | 5/1995 | Dolin, Jr. et al. |
| 5,550,823 A | * | 8/1996 | Irie et al. ..................... 370/413 |

FOREIGN PATENT DOCUMENTS

| EP | 0 621 708 A2 | 10/1994 |
| EP | 0 648 034 A1 | 4/1995 |

OTHER PUBLICATIONS

UNIX Internetworking, Uday O. Pabrai, Artech House, Boston, London.
Rate–Controlled Static–Priority Queueing, Hui Zhang et al, Computer Science Division 1993 IEEE, University of California at Berkely.
Serving Humanity Through Communications, SuperComm/ICC, New Orleans, May 1–5, 1994, vol. 1, Institute of Electrical and Electronics Engineers, R. Fan et al, "Expandable Atom Switch Architecture (XATOM) for ATM Lans", pp. 402–409.
Prentice–Hall International Editions, (1993), Andrew S. Tanenbaum, "Computer Networks", Second Edition, pp. 21–27; 141–148; & 373–375.

* cited by examiner

Primary Examiner—Edwin C. Holloway, III
(74) Attorney, Agent, or Firm—Morrison & Foerster, LLP (57) ABSTRACT

In the method, at least one timing message is generated by a first arrangement at predefinable time intervals and is transmitted to at least a second arrangement. The timing message contains a synchronization method, as a function of which time intervals which are provided for the transmission of data packets (DP) each having a predefinable priority class are determined. After reception of the timing message, the received timing message is evaluated, a synchronization time being determined, as a function of which the time intervals which are provided for the transmission of data packets each having a predefinable priority class are determined.

13 Claims, 5 Drawing Sheets

PROCESS FOR TRANSMITTING DATA PACKETS OF PREDEFINABLE PRIORITY CLASSES USING ETHERNET FROM A FIRST DEVICE TO AT LEAST ONE OTHER DEVICE

BACKGROUND OF THE INVENTION

Local computer networks which are configured according to the IEEE 802.3 Standard, which is referred to below as Ethernet Standard, constitute a technology with which terminals are connected via a commonly used, serial bus. The access to this bus is regulated by means of the so-called Carrier Sense Multiple Access/Collision Detection (CSMA/CD). The Ethernet protocol is a so-called fair protocol, i.e. when there is competing access, all the terminals connected to a bus have, on a statistical average, the same chance of transmitting via the bus their data which is to be transmitted, regardless of the type of data to be transmitted.

However, in many cases it is necessary to prefer certain data flows over others. Examples of this are data streams with real-time requirements, for example a sound data stream or a video data stream, but also alarm messages for controlling machines. Such data streams require a certain minimum quality during their transmission. Guarantees for such minimum quality levels are, however, currently not ensured with the Ethernet protocol, since with the CSMA/CD protocol it is not possible to make a distinction between data streams and therefore different treatment of data streams is also impossible.

The Ethernet bus is a passive transmission medium and the switching work is distributed between the terminals which also operate according to the Ethernet protocol. The so-called Switched Ethernet is a technology in which local networks according to the IEEE 802.3 Standard are coupled by means of packet switching instead of the otherwise customary Ethernet bus. Packet switching is implemented by means of the so-called Ethernet node. An Ethernet node has a plurality of bidirectional accesses, the so-called ports. The Ethernet node must pass on incoming data packets through at least one output port which is coupled directly or indirectly to the destination or destinations of the data packet. If different input packets are received and have to be output via the same output port, the packets are buffered. The buffer used for this can overflow in cases of high load and newly arriving data packets are lost in this case.

Various packet formats of the Ethernet protocol are known from the following document, U.O. Pabrai, UNIX Internetworking, Artech House, Boston, London, page 23, 1993.

The invention is based on the problem of specifying a method which is compatible with the Ethernet Standard and with which a certain minimum quality of the transmission for data streams is ensured with respect to real-time requirements for the transmission.

In the method according to the present invention, at least one timing message is generated by a first arrangement at predefinable time intervals and is transmitted to at least one second arrangement. The timing message contains a synchronization message, as a function of which the time intervals which are provided for the transmission of data packets (DP) each having a predefinable priority class are determined. After reception of the timing message, the received timing message is evaluated, a synchronization time being determined, as a function of which the time intervals which are provided for the transmission of data packets each having a predefinable priority class, are determined.

By means of this method, it becomes possible to reserve during the entire communications connection the resources which are assigned to a predefinable communications connection, are exchanged in a communications setup phase and are required during the communications connection. In this way, considerably more secure guarantees for the quality requirement of the data packets to be transmitted can be fulfilled.

Advantageous developments of the present invention are as follows

In one development of the method it is advantageous to assign a priority class to each data packet to be transmitted by a first arrangement, and to mark the data packet according to the priority class. Then, the data packet is transmitted to a second arrangement taking into account the priority class.

A considerable advantage of this development is especially the fact that it is possible to prioritize the data packets, for example depending on the type of the data stream to be transmitted. In this way, it is possible, on a statistical average, to ensure the required quality for data packets which require a higher priority because of quality requirements relating to real-time requirements during transmission.

The expression "on a statistical average" is to be understood in this context to mean that it is possible to ensure the quality requirements with a certain degree of probability according to the priority class used. The cause of this that the data packets are transmitted according to their priority, for example data packets with a relatively high priority are preferred over data packets with a relatively low priority.

In order to be able to implement a multi-stage communications connection, i.e. a communications connection via several Ethernet switching nodes, it is advantageous in one development of the invention that the data packet is received from a second arrangement, the priority class assigned to the data packet is determined and in the case of which, in turn, the data packet is transmitted on taking into account the priority class.

By means of this procedure, the method is simplified since an entirely new priority class for the data packet does not, in turn, have to be formed in each switching node and assigned to the data packet, rather merely the priority class which has previously been assigned to the data packet is determined, and the priority class continues to be used in the rest of the method.

In order to assign the priority class to the data packet it is advantageous to analyze information contained in the data packet fed to the so-called Ethernet layer and relating to the type of the data packet and thus to the type of the communications connection or else to the type of the data stream, and to take into account the analyzed information in the assignment of the priority class. In this way, it becomes possible automatically to analyze and to ensure the type of the data packet, and thus the quality requirements of the data stream.

In addition, in one development of the invention it is advantageous to carry out an access check for the data packet, as a result of which it is possible to prevent the arrangement with which the method is carried out from being overloaded as a result of an excessive number of data packets to be transmitted.

In addition, in one development of the invention it is advantageous to divide up a buffer of the arrangement into a plurality of parts and to assign each part of the buffer to at least one priority class in each case. This means that in each case only data packets of the corresponding priority class can be stored in the corresponding part of the buffer.

The development described above is improved even more by virtue of the fact that the data packets are output from the corresponding parts of the buffer and transmitted in a predefinable sequence. The sequence can be predefined according to any desired scheduling method.

In addition it is advantageous that, in the event of the buffer memory, or part of the buffer memory in an arrangement which is configured as an Ethernet switching element, overflowing, the data packet causing the overflow is rejected only if it is not possible to abort the reception procedure by means of an artificial collision for this data packet.

In addition, in one development it is advantageous to generate the artificial collisions of the data packets only for data packets for whose source arrangement the generation of an artificial collision is known to be permissible, i.e. can be processed by the transmitting arrangement, for example. This development makes a selection for the arrangements which can process an artificial collision of a transmitted data packet.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
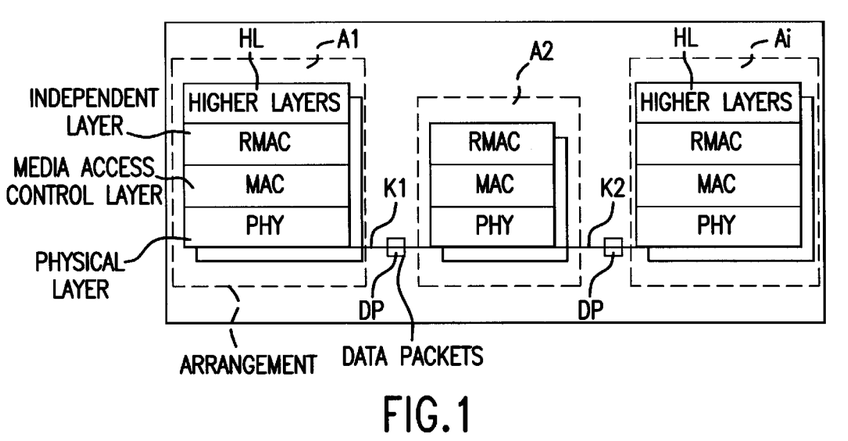
FIG. 1 shows a diagram of arrangements of a communications connection with two terminals and a switching unit, which exchange data packets according to the Ethernet protocol.

FIG. 1 illustrates arrangements of a communications connection (illustrated by way of example), in which data packets are transmitted according to the Ethernet Standard.

A first arrangement A1, a second arrangement A2 and further arrangements Ai are illustrated.

In this exemplary case, the first arrangement A1 is embodied as an Ethernet terminal. The second arrangement A2 is embodied as a switching element, as a so-called Ethernet switching node (Ethernet switch). A further arrangement Ai is in turn configured in this exemplary case as an Ethernet terminal. Each further arrangement Ai is unambiguously marked with a first index i, the first index i being any desired natural number.

Between the arrangements A1, A2, Ai there is a point-to-point connection, through a first coupling K1 between the first arrangement A1 and the second arrangement A2, and a second coupling K2 between the second arrangement A2 and the further arrangement Ai.

However, it is also possible for arrangements which are configured as Ethernet terminals to be coupled directly to one another in the so-called shared Ethernet, and not separated by means of at least one arrangement configured as a switching element, as in the so-called switched Ethernet.

Since the Ethernet Standard is oriented according to the so-called layer model of the International Standardization Organization (ISO), the arrangements in the main illustration are described in the form of communication layers. The couplings K1, K2 form the physical medium, together with the so-called physical layer PHY, which may also be referred to as a bit transmission layer. The Ethernet layer, for example the layer of Media-Access Control (MAC layer) is coupled to the bit transmission layer. The standardized Ethernet protocol is carried out in the Ethernet layer. Developments of the method can be considered logically as an intermediate layer between the MAC layer and further, higher communications layers. For this reason, in FIG. 1, the method is illustrated as an independent layer RMAC (Real Time Media-Access Control).

The independent layer RMAC designated below as intermediate layer RMAC is, on the one hand, coupled to the MAC layer and, on the other hand, coupled to further communications layers. Further communications layers are to be understood as any desired, known transportation protocols, for example TCP/IP (Transport Control Protocol/Internet Protocol) or UDP/IP (User Datagramm Protocol/Internet Protocol) or IPX, etc. All the communications layers which are arranged logically above the intermediate layer RMAC are referred to in their totality in FIG. 1 as higher layers HL for sake of simplicity. The general structure of the arrangements relating to the higher layers HL and of the bit transmission layer PHY and the MAC layer can be as desired within the scope of the respective protocol being used. Since the second arrangement in this exemplary case is configured as an Ethernet switch, the second arrangement does not have any higher layers HL in this case. This is not necessary according to the Ethernet Standard.

Even if only three arrangements are illustrated in FIG. 1, a communications connection in which the method is carried out can extend over any desired number of arrangements since the Ethernet protocol relates only to a connection of arrangements which are directly coupled to one another.
Signaling Possible signaling for the communications connection, in the form in which it is illustrated, for example, in FIG. 1, is described in FIG. 6.

Figure 6:
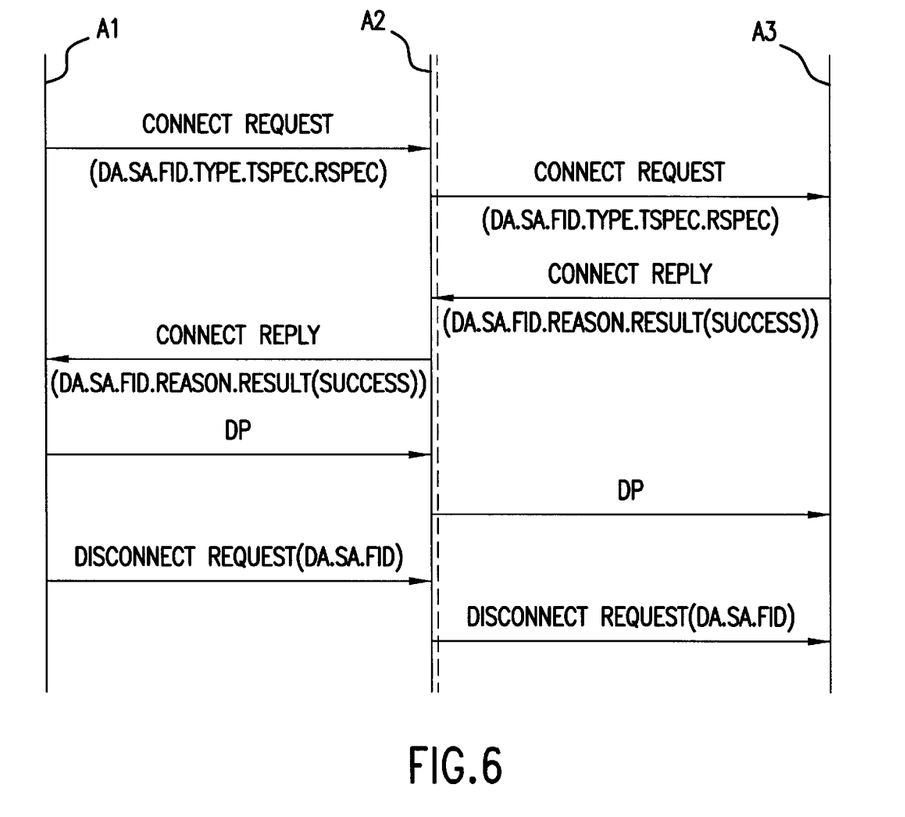
FIG. 6 shows a message flowchart in which, by way of example, a signaling operation and the exchange of data of the arrangements illustrated in FIG. 1 is described.

A connection request (Connect Request) is transmitted to the second arrangement A2 from the first arrangement A1. The Connect Request contains, for example, the target address DA, the transmitter address SA, the flow identifier statement FID, the field type as well as a parameter field TSpec in which it is stated which quality features are requested for the communications connection, as well as, for example, a service class field RSpec, in which it is indicated which service class, for example, which priority class PKi is requested for the communications connection.

The Connect Request is passed on directly to the further arrangement Ai from the second arrangement A2. In the case of a communications connection which is routed via a plurality of Ethernet switching units, the second arrangement A2 is to be understood as a quantity of switching units which each pass on the Connect Request and the corresponding further data packets DP to that terminal which constitutes the corresponding terminal for the communications connection.

The terminal, for example the further arrangement Ai, transmits a Connect Reply which, in addition to the target address field DA, the transmitter address SA and the flow identifier FID, contains a Result (Success) statement, in which it is stated whether or not the requested communications connection has been accepted.

In addition, in a Reason result statement it is stated why the communications connection has, for example, not been accepted. A cause of this can, for example, be an excessively low available bandwidth in the communications network. These statements can be coded in a predefinable way, and these fields thus contain only random numerical values.

The Connect Reply response is passed onto the first arrangement A1 via "all the second arrangements" A2. After the reception of the Connect Reply response in the first arrangement A1 and of a positive response, i.e. a response to the effect that the communications connection has been accepted, this connection setup phase described above is terminated.

This is followed by the actual transmission of the useful data, that is to say of the data packets DP to which in each case there is assigned according, for example, to the negotiated priority class PKi or even a freely predefinable priority class PKi which can be defined by the transmission, or else which are in each case assigned adaptively to the data packet DP, for example as a function of the network loading of the respective Ethernet switching arrangement.

If a communications connection is aborted, this is achieved, for example, by virtue of the fact that a connection abort request (Disconnect Request) is transmitted to the second arrangement A2 by a transmitter, for example the first arrangement A1, and is passed on from the second arrangement A2 to the further arrangement Ai. The connection abort request Disconnect Request contains, for example, the target address DA, the transmitter address SA and the flow identifier FID.

Implementing the Priority-controlled Transmission at the Bit Transmission Layer

In the method there is provision for the bandwidth which is available, in each case, for example in the Ethernet or else for a communications connection within the scope of the Ethernet, is divided into a plurality of bandwidth areas, for example corresponding to the number of priority classes PKi provided.

Each part of the bandwidth serves to transmit the data packets DP which are assigned to the priority class PKi to which the respective part of the bandwidth is also assigned.

For the sake of simpler illustration, the quite simple case in which only two priority classes PK0 and PK1 are provided (cf. FIG. 7) is described below. However, this does not in any way restrict the general applicability of this method for any desired number of priority classes and thus to any desired number of time slots.

Figure 7:
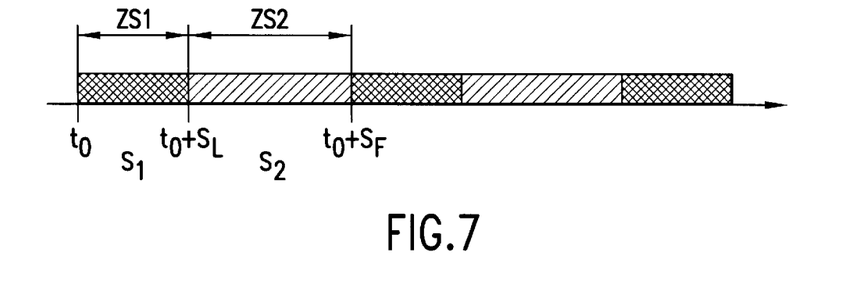
FIG. 7 shows a diagram in which a chronological division of the bandwidth of the communications connection into a plurality of time intervals for various priority classes is illustrated.

For this case, for example, two time slots, a first time slot ZS1 and a second time slot ZS2, are provided. The first time slot ZS1 is, for example, for high-priority data, that is to say for data packets DP to which the second priority class PK1 has been assigned, and the second time slot ZS2 is provided for data packets to which the low priority class PK0 has been assigned.

Here, there is provision, in a development of the method, to simplify the method in such a way that only the magnitude of the first time slot ZS1 is administered. This means that it is advantageous for the time slots ZS1, ZS2 to be of variable configuration in terms of their width. Starting out from a freely predefinable reference time $t_0$, a starting time of the second time slot ZS2 is obtained from the sum of the reference time $t_0$ and a time slot length S1 of the first time slot ZS1.

The time slot length S1 is selected in such a way that offered traffic $A_H$ of all the high-priority data streams can be transmitted. The following applies:

$$A_H < \frac{S1}{S_F} \cdot B$$

B designates the bandwidth of the corresponding Ethernet segment. $S_F$ designates the sum of the time slot length S1 of the first time slot and a time slot length S2 of the second time slot ZS2 ($S_F$=S1+S2). The above rule gives only a rough guide to the dimensioning of the first time slot length S1. Any desired rule for dimensioning, i.e. dividing up of the individual time slot lengths is known to the person skilled in the art.

If there are requests for the maximum delays $T_{Dmax}$ of the data which are to be transmitted with high priority, the following rule, for example, is to be complied with:

$$S_F < \min T_{dmax} + S1$$

(all the high-priority communications connections)

In one development of the method it is advantageous to synchronize the reference time $t_0$ of a freely predefinable arrangement, for example by means of timing messages at freely predefinable time intervals, i.e. the reference time $t_0$ is transmitted to all the other arrangements by an arrangement in freely predefinable time intervals. The timing message is received by the arrangements and used as their new reference time $t_0$. Genuine synchronization of the arrangements is not possible in the Ethernet. However, this periodic freshening up of the reference times $t_0$ permits sufficiently precise coordination of the clocks contained in the operating systems of the arrangements.

The standardized Ethernet protocol also has, in particular, the disadvantage that, as a result of the free access, in accordance with the CSMA/CD protocol, of all the equipment connected to the Ethernet bus, free access is possible for all the data packets DP to be transmitted, irrespective of the type of data to be transmitted.

The result of this is that for data streams which make predefinable real-time requests relating to the transmission of the data packets DP of the corresponding communications connection, [lacuna] cannot be ensured.

The various real-time requests are referred to below as quality features. Quality features are to be understood, within the scope of this document, as, for example, the following criteria:

delay times of the data packets DP, delay time fluctuations in the data packets DP, losses of the data packets DP given overloading of the communications connection or of the arrangements, useful data rates, etc.

Figure 2:
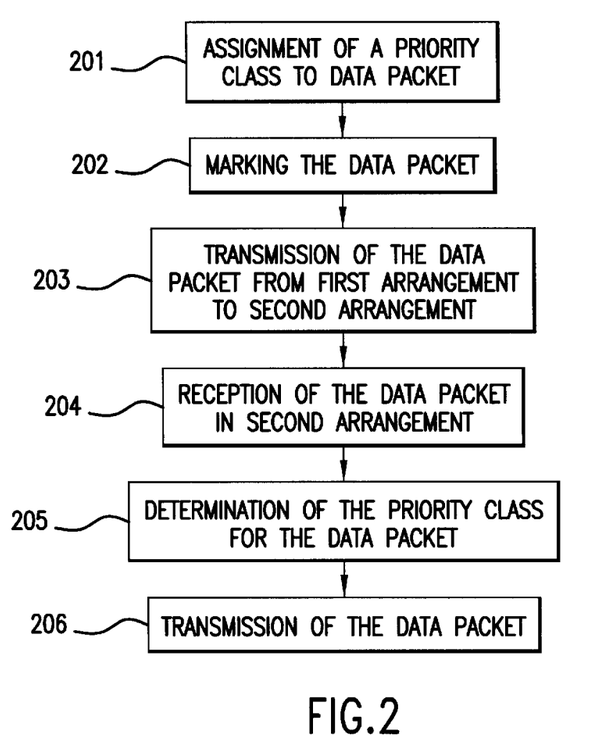
FIG. 2 shows a flowchart in which developments of the method are illustrated.

In order to be able to ensure specific quality features which are completely application-specific and can be freely predefined in an application-specific fashion, the method has, in an advantageous development, the following method steps which are illustrated in FIG. 2.

The data packet DP to be transmitted is fed to the intermediate level RMAC by a higher level HL. In order to transmit the data packet DP in the Ethernet, the following method steps are provided in this development.

In a first step 201, the data packet DP is assigned a priority class PKj from a quantity of any desired number of priority classes PKj. Each priority class PKj is unambiguously marked with the second index j, the second index j being any desired natural number.

In a further step 202, the data packet DP is unambiguously marked in accordance with the priority class PKj.

In a last step 203, the data packet DP is transmitted by the first arrangement A1, in which the method is being carried out, to the second arrangement A2.

In one development of the method, further method steps are provided which are also illustrated in FIG. 2.

In a further method step 204, the data packet DP is received by the second arrangement A2.

Then, in the second arrangement A2, the priority class PKj which has been assigned to the data packet DP in the first arrangement A1 is determined 205.

Taking into account the priority class PKj which has been determined, the data packet DP is transmitted on 206, in this exemplary case which is illustrated in FIG. 1, to the further arrangement Ai.

The concrete embodiment of the individual method steps in this exemplary embodiment will be explained in more detail below.

Assignment of the Priority Class PKj to the Data Packet DP 201

Generally, the assignment of the priority class PKj to the data packet DP signifies a mapping of the possibly large number of required quality features onto the priority class PKj, by means of which the corresponding combination of necessary quality features is ensured.

Even if the number and properties of the quality features are random, it has proven advantageous to take into account the following quality of service parameters (QOS parameters) in order to ensure the quality features in the method. It has proven sufficient for the following four priority classes PKj (j=0, 1, 2, 3) to be taken into account within the scope of this method.

A first priority class PK0 is provided for a connectionless communications connection in which all that is assured is that the respective data packet DP is transmitted, with an unspecified bit rate, as well as possible depending on the utilization rate of the communications network without anything being ensured and without a connection setup. Thus, the first priority class PK0 corresponds to the lowest priority which can be assigned to the data packet DP.

A second priority class PK1 is provided for a connection-orientated communications connection in which a controlled delay, i.e. a maximum delay of the transmission of the data packet DP, is ensured statistically. In the so-called controlled delay service, the following features, for example, are implemented:

a bandwidth which is required for the connection and which is negotiated in a further described connection setup is ensured;

the average delays during the transmission of the data packet DP when there is a high degree of loading of the communications network are in no way worse than the delays of the data packet DP to which the first priority class PK0 has been assigned;

the maximum delay in the transmission of the data packet DP with a high degree of loading of the communications network is considerably lower than that of data packets DP of the first priority class PK0;

the loss rate of the data packets DP owing to overflowing of the buffer memory PS of the arrangements A1, A2, Ai is not considerable as long as the properties of the data stream, that is to say of the communication connection negotiated in the "traffic contract" negotiated in the connection setup phase, for the respective communications connection are maintained.

With the second priority class PK1, a service is thus implemented with which a bandwidth demand with few real-time requirements, or with none at all, is ensured. The second priority class PK1 is suitable, for example, for burst-type traffic with a demand for a communications connection for a specific bandwidth.

A third priority class PK2 relates to a connection-orientated communications connection. The following services, for example are provided for data packets DP to which the third priority class PK2 has been assigned:

most data packets DP are actually transmitted completely;

in most cases, the delay of the data packets DP during the transmission will not exceed a predefinable maximum delay time for the transmission of the data packets DP.

In this context, the expression "most data packets" is to be understood such that it is a predefinable number which is to be stated, for example, in the connection setup phase. It is, for example, sufficient in many cases that one of 1000 transmitted data packets DP within a second and at maximum one of 10,000 data packets DP in even longer time intervals would exceed the limit given by the value for "most data packets". Thus, the third priority class PK2 will ensure a service in which a controlled delay plus a maximum delay limit is ensured, thus implementing an "quasi-real-time" service.

A fourth priority class PK3 is also provided for a connection-orientated communications connection. In the fourth priority class PK3 which corresponds to the highest priority which can be assigned to the data packet DP, the following services, for example are ensured:

the bandwidth, for example, which is required for the communications connection and which is negotiated during the connection setup is made available;

predefinable maximum delay times for the data packet DP are guaranteed during the transmission;

no losses of data packets DP occur owing to overflowing of the buffer PS.

Thus, the communications-connection parameters in the fourth priority class PK3 which are negotiated during the connection setup are ensured with a very much higher degree of statistical reliability than in the case of the other priority classes PK0, PK1, PK2 as long as the entire communications network does not collapse, for example owing to a fault in the communications network.

Marking of the Data Packet DP According to the Assigned Priority Class PKi 202.

The method of marking the data packet DP so that the receiver of the data packet DP can in each case determine which priority class PKi has been assigned to the data packet DP can be carried out in various ways.

A customary Ethernet data packet DP has, for example, the following fields in the data packet DP which are mentioned in the Ethernet Standard (cf. FIG. 3a):

a destination address field DA in which the address of the receiver of the data packet DP is stated;

a transmitter address field SA in which the address of the transmitter of the data packet DP is stated;

a field type which is interpreted by the receiver of the data packet DP as an integer and is usually of the length of two octets. The field type is interpreted differently depending on the number in the field. If the number is smaller than 1500, the field type is interpreted, for example, as a long field, and the rest of the data packet DP corresponds to the customary so-called logic-link control format (LLC format). If the number in the field type is, however, not smaller than 1500, the number is interpreted as a type statement. The type statement contains a code for the network protocol which has generated the following information contained in the data packet DP.

In the so-called LLC format, the network protocol is defined by the so-called service access point (SAP), the LLC service access point (LLC SAP). An example of such a packet format is illustrated in FIG. 3c. FIG. 3e illustrates a variant of the LLC format, the so-called LLC subnet attachment point format (SNAP) in which the service access point (SAP) is set permanently to the value hexadecimal 0A. The network protocol is coded in a separate field type in this variant (cf. FIG. 3e).

In addition, all the protocol elements have an information field Info containing the actual information in the data packet DP which has been supplied by higher layers HL and is to be transmitted.

Also, a fault detection field FCS with a check sum code in the protocol formats is provided.

The marking of the data packet DP with the priority class KPi assigned to the data packet DP can be carried out in different ways depending on the respective protocol format.

Figure 3A:
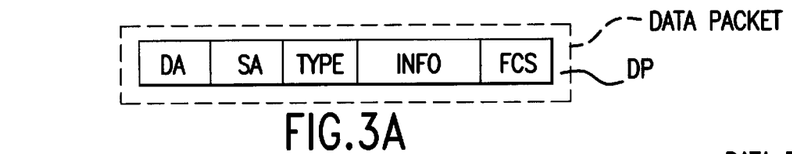
FIGS. 3a to 3f show a diagram in which various protocol formats of the Ethernet Standard, and various associated possible ways of marking a data packet are illustrated.
Figures 3B, 3C:
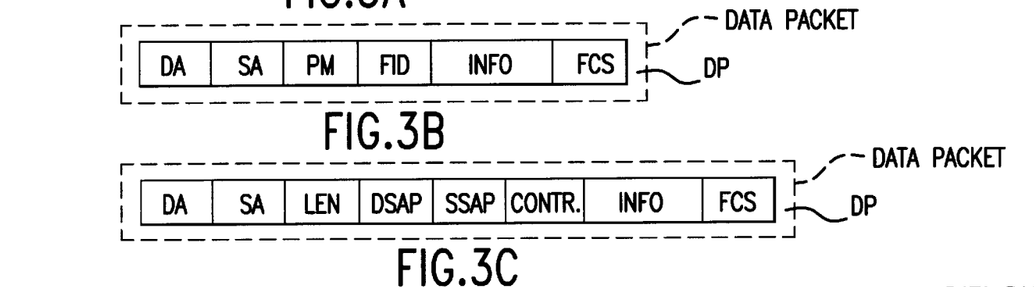
Figures 3D, 3E, 3F:
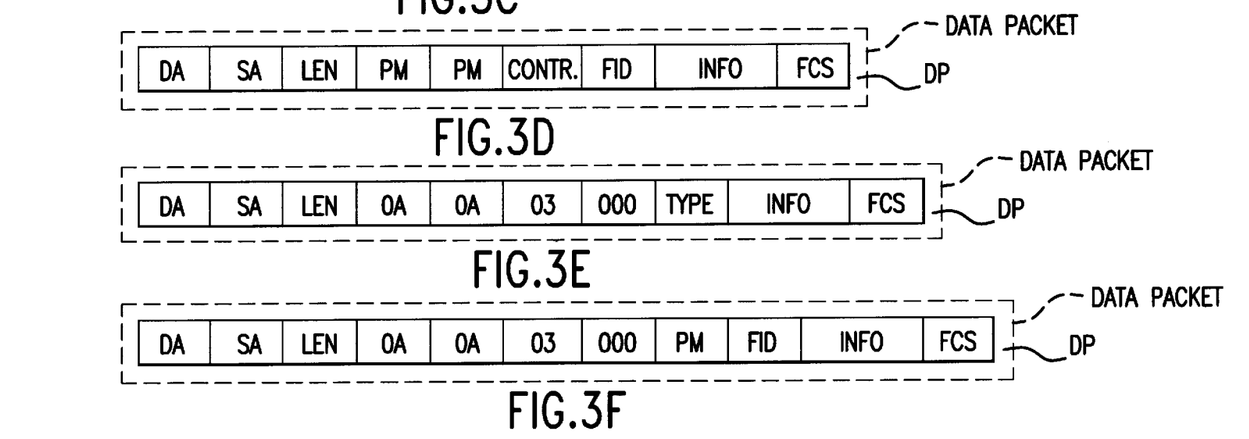

In FIG. 3b, a priority mark PM is entered in the field type for the customary protocol format from FIG. 3a. The priority mark PM is an unambiguous value with which the priority class PKi is unambiguously indicated. This value must generally be reserved unambiguously for the corresponding priority class.

In addition, there is provision in one variant of the method for data packets DP with the lowest priority, that is to say for example of the first priority class PK0, not to be marked at all but rather to be used without modification in accordance with the customary Ethernet Standard.

Since it is possible for an arrangement to operate with layers HL of different levels, for example both with the TCP/IP protocol, on the one hand, and also with the SPX/IPX protocol, on the other, for different communications connections it is, in one development of the method, advantageous to provide a further field in the data packet DP. The further field is referred to as a flow identifier FID. The flow identifier FID is unambiguously generated in the arrangement transmitting the data packet DP. Thus, it is possible for the receiver of the data packet DP to determine, with reference to the data packet DP, an unambiguous assignment of the data packet DP to the type of the communications connection, the priority mark PM and the Service Access Point, and of the coupling to the higher layers. This is possible since, as a result of the procedure described above, the combination of the MAC transmitter address and of the flow identifier FID is unambiguous worldwide, and can thus be used for unambiguous assignment of the data packet DP in the receiver of the data packet DP.

Since, as has been described above, in the case of marked data packets DP the original field content of the field type is described, the information which is contained therein relating to the associated network protocol must previously be transmitted separately to the receiver, for example to the second arrangement A2. This takes place in a signaling phase which is explained in more detail below.

The marking for the protocol format which is described in FIG. 3c is illustrated in FIG. 3d. Here, the priority mark PM is contained in the field DSAP which usually contains the receiver service access point of the higher layer HL.

In addition, the priority mark PM can also be contained, instead or additionally in a field SSAP which usually contains the value of the service access point of the higher layer HL of the transmitter of the data packet DP.

In this variant, the field of the flow identifier FID is, in one development, likewise additionally provided in the data packet DP.

In the format which is illustrated in FIG. 3e, the priority mark PM is, for example, transmitted in the field type (cf. FIG. 3f). In addition, there is, in turn, a field provided for the flow identifier FID. This possibility of converting the priority mark PM, and thus the statement of the priority class PKi, into a marking of the data packet DP constitutes merely one of a large number of examples.

In variants, it is likewise possible to provide new fields for receiving this information.

If different service access points are used for different data streams, the assignment of the data stream to the priority class PKi is written into a table, and each data packet DP which is assigned to the data stream is assigned the corresponding priority class PKi which has been defined in the table.

If, however, it is not the case that a separate access point is provided for each data stream, there is provision to determine the identification number of the port of the data packet DP which has been supplied by a TCP/IP layer. However, other information which identifies the data stream to which the data packet DP is assigned, and which has already been generated in higher layers than, for example, the TCP/IP layer, can also be identified and evaluated.

The result of this is, for example, that in the event that it was possible to identify the associated data stream for the data packet DP, it is possible to perform a mapping onto the corresponding priority class PKi which is to be assigned to the data packet DP.

In one development of the method there is, in addition, provision for the mapping of the quality features which are to be ensured for the data stream, that is to say the communications connection, to be designed so as to be dynamically configurable during a connection setup phase. If no connection setup phase has been carried out for the datastream to which the data packet DP is assigned, in the simplest case the data packet DP is correspondingly assigned the first priority class PK0.

The arrangement and the method are explained in more detail by means of the following example. The transport protocol used by any desired application ANW (cf. FIG. 4), for example any desired program, uses the UDP/IP protocol in order to transmit video data over the Ethernet.

If the port number of the UDP data stream to be transmitted is known, it is possible for resources to be requested for the connections. Here, for a signaling operation which is described below, a resource administration unit BMV determines which resources are required for which UDP port number.

The resource administration unit BMV carries out, for example, a connection setup phase and marks the new communications connection unambiguously. The marking is detected by the arrangement in that, for example, the UDP port number is evaluated, and, based on this number, the communications connection for the data packet DP and the corresponding priority class PKi can be determined.

Figure 4:
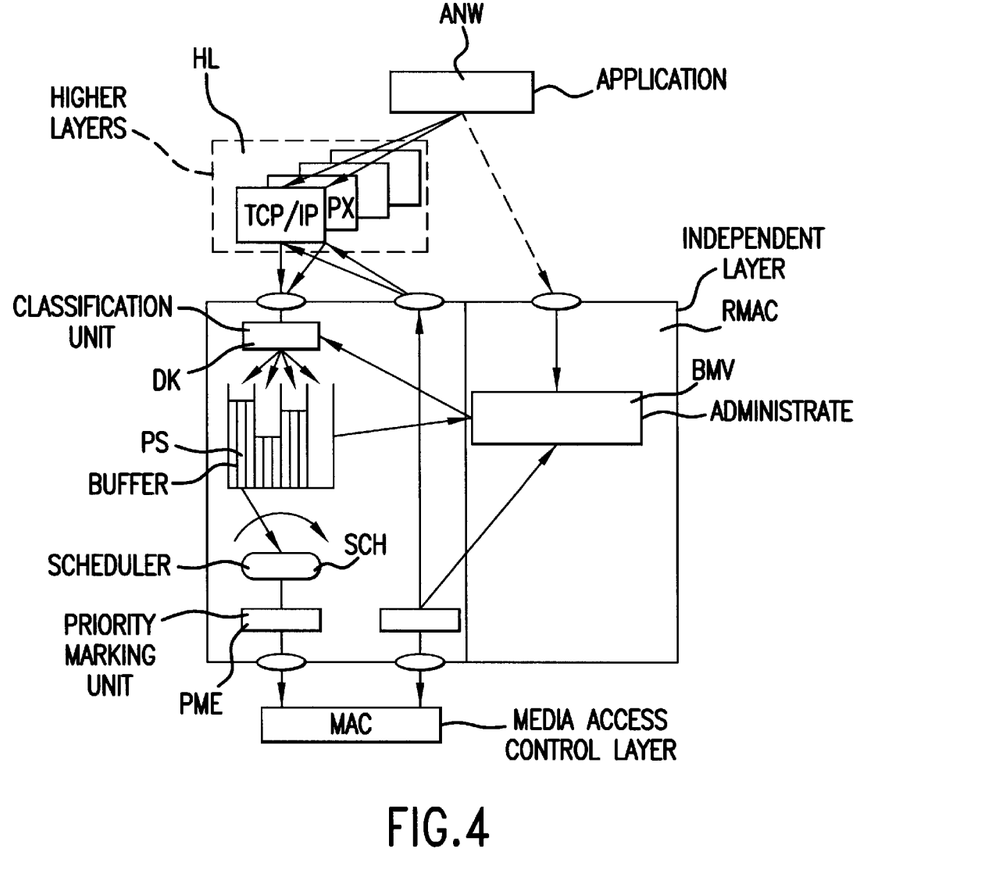
FIG. 4 shows a diagram of the arrangement, with a number of further developments and detailed illustrations with which the interaction with further communications layers is described.

FIG. 4 illustrates the arrangement with which the method can, by way of example, be carried out. The arrangement, for example the first arrangement A1, the second arrangement A2 and the further arrangement A1 has at least one data packet classification unit DK, one priority marking unit PME and a buffer PS.

The arrangement is logically arranged between the higher layers HL and the MAC layer.

The data-packet classification unit DK is configured in such a way that the mapping of the quality features onto priority classes PKi described above can be carried out.

The priority marking unit PME is configured in such a way that the marking described above, for example therefore the writing of predefined values into specific, predefinable data fields of the data packet DP, is carried out.

The data packet DP to be transmitted is supplied by the higher layers HL of the arrangement. Here, it is fed to the data-packet classification unit DK, which determines the priority class PKi for the data packet DP and the data packet DP is stored in the buffer PS.

In a further development of the method there is provision to assign separate parts of the buffer PS of a predefinable magnitude to the individual priority classes PKi. Only the data packets DP to which the priority classes PKi which correspond to the part of the buffer PS has been assigned are written in each case into the separate parts which are assigned to the priority classes PKi. The individual parts of the buffer PS are preferably configured according to the First-In-First-Out principle (FIFO buffer). In this way, it is easily possible to implement a so-called queue for the data packets DP before the transmission of the data packets DP.

A simple way of implementing the method is made possible by means of this refinement of the arrangement.

Any desired scheduling method can be used to read out the data packets DP from the parts of the buffer PS. An overview of the various scheduling methods is given in the following document, H. Zhang and D. Ferrari, Rate-Controlled Static-Priority Queuing, Proc. Of INFOCOM '93, San Francisco, Calif., April 1993.

A very simple algorithm for reading out the data packets DP from the parts of the buffer PS can take the form in which whenever a data packet DP is to be read out of the buffer PS for the transmission of the data packet DP, in each case that part of the buffer PS which corresponds to the highest priority class, for example to the fourth priority class PK3, is examined and checked to determine whether a data packet DP is waiting for transmission in this part of the buffer PS. If this is not the case, in succession and in descending order of priority, the next part of the buffer PS to which the next lowest priority class PKi−1 is respectively assigned is correspondingly searched for. In one development of the arrangement, a scheduler unit SCH is provided for carrying out the appropriate scheduling method.

In one development of the arrangement, the resource administration unit BMV is additionally provided.

The resource administration unit BMV is configured in such a way that at least one of the following functions is ensured by the resource administration unit BMV:

the resources of the respective arrangement A1, A2, Ai and/or resources of a communications network used for transmitting the data packet DP are administered, these being, for example, the buffer PS, the bandwidth of the Ethernet, which is to be reserved, for example, for a communications connection, the scheduler SCH, etc.;

for the data packet DP, an access control is carried out as a function of which it is determined whether or not the data packet DP is further processed;

a signaling operation is carried out between the arrangement and at least one further arrangement with which the arrangement is connected. In this signaling operation, no characteristics of the communications connection, for example the reserved required bandwidth and further quality features for the communications connection which are ensured for the communications connection to which the respective data packet DP is assigned are defined.

In one development of the arrangement it is advantageous to assign a separate, independent Media-Access-Control address (MAC address) to the resource administration unit BMV. As a result, it becomes possible to implement the resource administration unit independently, only physically connected, of the rest of the arrangement and to communicate with the arrangement only via couplings.

Generation of Artificial Collisions

In one development of the method there is provision, in an arrangement configured as an Ethernet switch, to generate, in the event that the buffer PS or a part of the buffer PS is full and a data packet DP is to be written into the buffer PS or into the filled part of the buffer PS, a so-called artificial collision for the data packet DP to be written in, as a result of which the transmitter is directly informed that the data packet DP cannot be processed at the respective time.

The transmitter of the data packet DP subsequently aborts the transmission of the data packet DP and the transmission attempt of the data packet DP is not repeated until after a randomly selected time period. This prevents data packets DP being lost since the transmitter of the data packet DP completely transmits the data packet DP once more.

However, since in this development of the method, the propagation times for the data packet DP increase by the amount of the time up to the first successful transmission attempt of the data packet DP specifically not only for the data of the communications connections which have to pass through the filled buffer PS but also for all the data packets DP of the braked, i.e. "blocked" transmitter, irrespective of the destination of these data packets DP or of which communications connection these data packets DP belong to, it is advantageous to provide the following development.

However, in the case of data to be transmitted with, for example real-time requirements, excessively long delays are, as has been described above, not acceptable under certain circumstances. For this reason, it is advantageous to protect transmitters with such requirements against artificially generated, undesired collisions of the data packets DP, since it is often more acceptable, with these types of data streams, to accept packet losses which are caused by the overflowing of the buffer PS and/or of the part of the buffer PS than to accept blocking of the entire network interface of the transmitter.

This problem is solved in that the use of the generation of artificial collisions, which is referred to below as backpressure, is permitted, or prohibited, to terminals in a specific and dynamic fashion.

For this purpose, automatic assignment of the statement whether or not the backpressure method is permitted for the respective terminal which is identified by means of the MAC address is implemented. For this reason, it is necessary for the receiver which is configured, for example, as an Ethernet switch, of the data packet DP to be able to detect whether or not the transmitter of the data packet DP is authorized for a backpressure method. This information can be contained, for example, in the packet format which is illustrated in FIGS. 5a to 5f and/or can be entered in a table in the receiver of the data packet DP, in each case in a terminal-specific fashion.

Figure 5A:
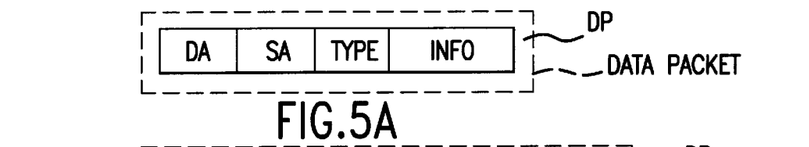
FIGS. 5a to 5f show various protocol formats and associated possible ways of implementing a back-pressure method (described below) in compliance with the Ethernet Standard.
Figure 5B:
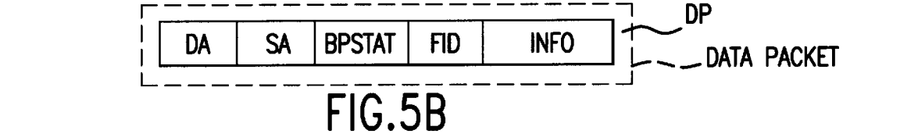
Figure 5C:
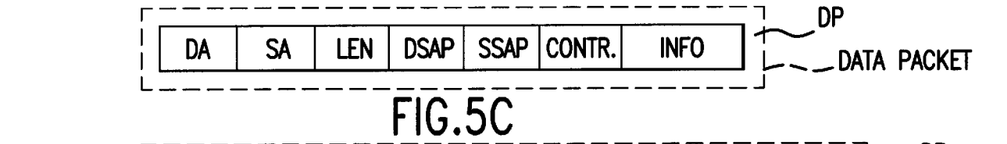
Figure 5D:
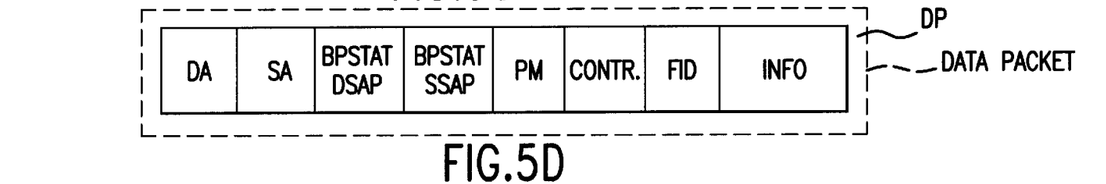
Figure 5E:
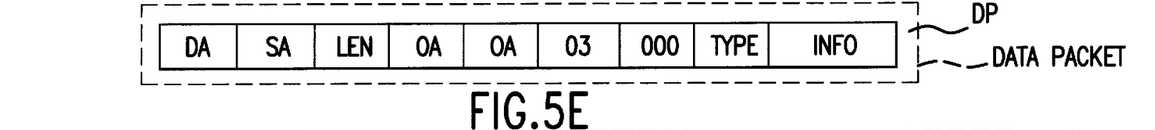

The packet formats (illustrated in FIGS. 3a, 3c and 3e) for an Ethernet data packet DP are illustrated in FIGS. 5a, 5c and 5e.

In this development of the method there is provided, for example in the field type, a status statement BPSTAT with which it is stated whether or not the backpressure method is authorized for the transmitter of the data packet DP.

Figure 5F:
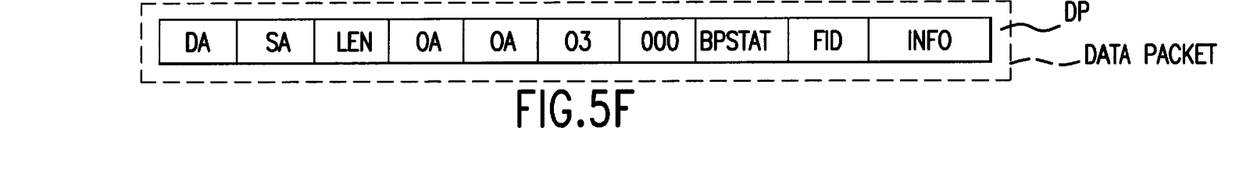

Likewise, a flow identifier field FID is provided in one development (cf. FIGS. 5b, 5e, 5f). Even if the same fields have been used in this exemplary embodiment, as was described for the priority classes PKi, there is, however, likewise provision in one variant for further fields to be provided in the protocol format, in order thus to be able to transmit both types of information in one data packet DP.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for transmitting data packets with predefinable priority classes in a network from a first arrangement to at least one second arrangement, comprising:

generating at least one timing message by the first arrangement at predefinable time intervals and transmitting the at least one timing message to at least the second arrangement which is coupled to the first arrangement;

determining timing intervals as a function of a synchronization message in the at least one timing message, the timing intervals being provided for transmitting data packets each with a predefinable priority class;

receiving the timing message by the at least one second arrangement;

evaluating the received timing message, a synchronization time being determined as a function of which the timing intervals, which are provided for the transmission of data packets each having a predefinable priority class, are determined; and reserving, for a communications connection which has any desired number of data packets to be transmitted, predefinable resources for the communications connection at a beginning of the communications connection as a function of the time intervals.

2. The method as claimed in claim 1, wherein a data packet is transmitted only in a time interval which is provided for a priority class which has been assigned to the data packet.

3. The method as claimed in claim 1, wherein a respective data packet to be transmitted is assigned one of at least two priority classes, wherein the respective data packet is unambiguously marked according to the priority class, and wherein the respective data packet is transmitted to the second arrangement taking into account the priority class assigned to the data packet.

4. The method as claimed in claim 3, wherein the respective data packet is received by the second arrangement, wherein the priority class assigned to the respective data packet is determined, and wherein the respective data packet is further transmitted taking into account the priority class assigned to the data packet.

5. The method as claimed in claim 3, wherein information contained in the respective data packet relating to at least one of a type of data packet and a communications connection to which the data packet is assigned, is analyzed, and wherein the assignment of the priority class is made taking into account the information.

6. The method as claimed in claim 1, wherein an access check is carried out for at least one data packet.

7. The method as claimed in claim 1, wherein signaling relating to a communications connection to which a respective data packet is assigned is carried out between the first and second arrangements with which the method is carried out and which are connected to one another, before the transmission of the respective data packet takes place.

8. The method as claimed in claim 3, wherein at least each priority class is assigned at least a part of a buffer, and wherein the respective data packet is stored only in the part of the buffer which is assigned to a priority class which was also assigned to the respective data packet.

9. The method as claimed in claim 8, wherein at least one of a number of stored data packets in the buffer and a number of stored data packets at least in a part of the buffer is determined, the part of the buffer being assigned to a priority class, and wherein only a data packet is stored which has a corresponding priority class with which the data packets stored in the buffer are output and transmitted in a predefinable sequence.

10. The method as claimed in claim 9, wherein a sequence is defined by the priority classes such that the data packets in the sequence are output and transmitted according to decreasing priority of the data packets.

11. The method as claimed in claim 9, wherein the sequence is defined by a predefinable scheduling method.

12. The method as claimed in claim 8, wherein when the buffer or at least a part of the buffer is completely filled with stored data packets which have not yet been read out, and when a further data packet to be transmitted is to be stored in the buffer or at least in the part of the buffer, an artificial collision is generated and information regarding the artificial collision is conveyed to the arrangement transmitting the data packet.

13. The method as claimed in claim 12, wherein an artificial collision is generated only if the data packet contains information that the generation of an artificial collision is permitted for the arrangement transmitting the data packet.

* * * * *